UNITED STATES PATENT OFFICE.

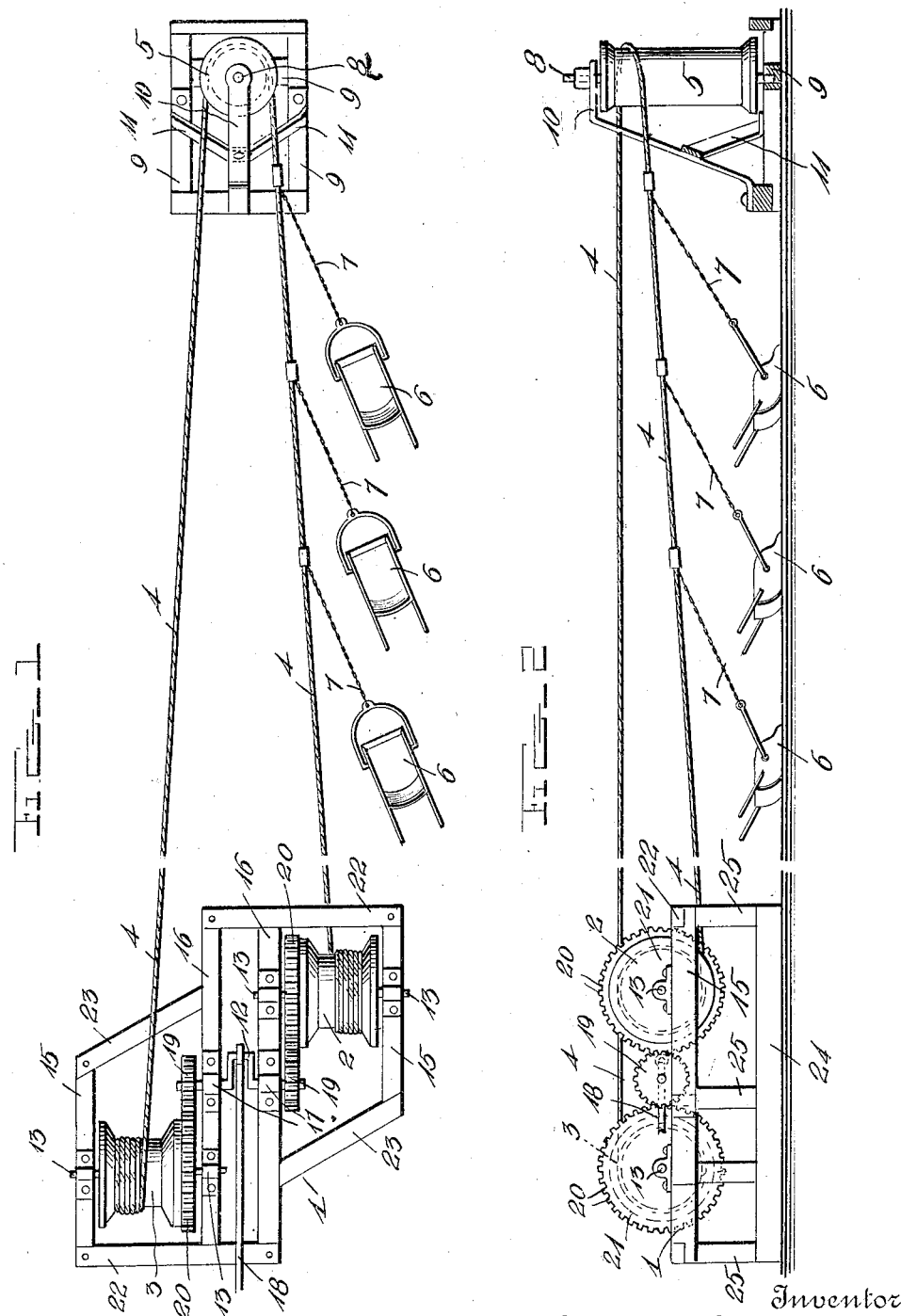

WILLIAM CLEMOW, OF CARBONDALE, PENNSYLVANIA.

EXCAVATING-MACHINE.

No. 896,892.   Specification of Letters Patent.   Patented Aug. 25, 1908.

Application filed February 10, 1908. Serial No. 415,219.

*To all whom it may concern:*

Be it known that I, WILLIAM CLEMOW, a citizen of the United States, residing at Carbondale, in the county of Lackawanna and State of Pennsylvania, have invented certain new and useful Improvements in Excavating-Machines; and I do declare the following to be a full, clear, and exact description of the invention, such as will enable others skilled in the art to which it appertains to make and use the same.

This invention relates to excavating machines and has for its object to provide an arrangement whereby the ordinary steel scoop may be drawn by power operated means instead of by draft animals.

Another object is to provide a device of this kind whereby the scoops may be drawn by a cable wound around a drum, said drum being driven in any suitable manner by power.

Another object is to provide a device of this kind wherein the drum operating mechanism is combined with the drum so that the various parts of the device are mutually held against displacement.

For this and other objects which will presently appear my device consists of certain novel arrangements and combinations of parts, of which the herein described excavating machine is an embodiment.

I do not limit myself to the minute details of the construction and the arrangement hereinafter described, but reserve the right to make such changes as lie within the spirit and scope of the invention.

In the annexed drawings, Figure 1 is a top plan view of my complete device, and Fig. 2 is a side elevation of the same.

The embodiment of my invention consists of the herein shown excavating machine comprising a supporting frame 1, on which are mounted winding drums 2 and 3, on which is wound the cable 4 passed over the end drum 5. On the cable intermediate the drums 2 and 3 and the drum 5 are fastened at any convenient point the scoops 6, by means of chains or the like 7. The drum 5 is rotatably supported in any convenient manner on a shaft 8, said shaft being supported by bottom and top pieces 9 and 10 connected by the side brace 11. The drums 2 and 3 may be connected to the source of power as the crank shaft 12 of an engine in any suitable manner, but the arrangement herein shown is preferred because of advantages which will hereinafter appear.

The drums 2 and 3 are provided with supporting shafts 13 rotatably mounted in the bearing box, mounted on outer side members 15, and inner parallel members 16. Said parallel members are also provided with bearing boxes 17, adapted to rotatably support the crank shaft 12, and between which the connecting link 18 reciprocates. The crank shaft 12 is provided at each end with pinions 19, adapted to intermesh with the gear teeth 20 of the gears 21.

At the inner ends of the drums 2 and 3 it will be noticed that the drums 2 and 3 are not in alinement with each other, but are so arranged that the gear teeth 20 intermesh with the pinions 19 on opposite sides of the axis of the crank shaft 12. This is advantageous because the drum 2 tends to hold the crank shaft 12 from displacement in one direction while the drum 3 tends to hold the crank shaft against displacement in the opposite direction. In this way the crank shaft is held in place much more securely and with less required strength, and therefore cost, of the supporting frame. The outer side pieces 15 are held in spaced relation with the parallel members 16, by means of end pieces 22 and angularly disposed braces 23. This in combination with the peculiar arrangement of the drums relative to the crank shaft forms a very strong and efficient supporting frame. The frame as thus described is duplicated by a lower supporting frame 24, to which the upper frame 1 is connected by uprights 25 placed under the meeting points of various members of the upper frame 1. The engine operating the connecting link 18 is not shown, as it forms no part of this invention, and any convenient source of power may be substituted therefor.

It will be noticed that the cable 4 meets the drum 3 on the upper side, and the drum 2 on the lower side. In this manner as is obvious when the engine is run the cable is wound onto one drum and off the other, thus moving continuously toward one drum. When the engine is reversed the movement of the cable is reversed.

The operation of my machine is as follows: The drum 5 is placed at a convenient distance from the frame 1, the material to be excavated or removed lying at some point intermediate the ends of the cable, preferably nearer the drum 5 or the frame 1. For example we will say that the material to be removed is nearer the frame 1, the engine is now started to cause the scoops 6 to move in a forward direction. The material to be removed is scooped into the scoops 6 and drawn by means of the chains 7 and cable 4 until the material is carried to the point at which it is wished that the material be dumped, say for example near the drum 5.

It will be understood that the material to be removed may be carried either toward or from the frame 1 or the frame 5 by reversing the direction of the motion of the engine, or by allowing the scoops to pass around the end drum 5.

It is thought that the operation and advantages of my device will be understood without further description.

I claim:—

1. In combination, a supporting structure, drums rotatably mounted on said supporting structure, said drums being placed out of alinement with each other, gears on the inner ends of said drums, a shaft provided with pinions adapted to intermesh with said gears, said gears intermeshing with said pinions on opposite sides of the axis of said shaft, means to rotate said shaft, and means wound around said drum adapted to direct the excavating means.

2. In combination, a supporting frame consisting of parallel members, and outer side pieces, end pieces and braces connecting said side pieces and said parallel members, drums rotatably mounted between said side pieces and said parallel members, one of said drums being mounted forwardly of the other drum, whereby the axis of said drums are out of alinement and parallel with each other, gears on the inner ends of said drums, a shaft rotatably mounted on said parallel members out of alinement and parallel with the axis of said drums and lying in the common plane of said axis, pinions on the ends of said shaft intermeshing with the gears of said drums said gears intermeshing with said pinions on the opposite sides of said shaft, means to rotate said shaft, a cable having one end wound in one direction around one of said drums and the other end wound in the opposite direction around the other of said drums, an end drum over which the intermeshing part of said cable is adapted to pass, a shaft to said drum bottom and top pieces supporting said shaft and side braces connecting said top and bottom pieces, chains fastened to said cable to scraper scoops fastened to the free ends of said chains.

In testimony whereof I have hereunto set my hand in presence of two subscribing witnesses.

WILLIAM CLEMOW.

Witnesses:
 CHARLES H. HORTON,
 LOUIS GRAMER.